United States Patent [19]

Hareng et al.

[11] Patent Number: 4,481,510
[45] Date of Patent: Nov. 6, 1984

[54] ELECTROOPTICAL SWITCHING DEVICE

[75] Inventors: Michel Hareng; Robert Hehlen; Serge LeBerre; Pierre Leclerc, all of Paris, France

[73] Assignee: Thomson-CSF, Paris, France

[21] Appl. No.: 333,408

[22] Filed: Dec. 22, 1981

[30] Foreign Application Priority Data

Dec. 23, 1980 [FR] France ............................ 80 27315

[51] Int. Cl.$^3$ .............................................. G09G 3/36
[52] U.S. Cl. ....................................... 340/784; 250/551;
340/752; 340/782; 350/333
[58] Field of Search ................. 350/333; 250/551;
340/718, 719, 752, 784, 782, 794

[56] References Cited

U.S. PATENT DOCUMENTS

| 3,078,373 | 2/1963 | Wittenberg | 340/794 X |
| 3,480,780 | 11/1969 | List et al. | 250/551 X |
| 3,761,768 | 9/1973 | Schmersal | |
| 3,947,842 | 3/1976 | Hilsum et al. | 340/784 X |
| 4,082,430 | 4/1978 | Schulthess et al. | 340/784 X |
| 4,345,248 | 8/1982 | Togashi et al. | 350/333 X |

FOREIGN PATENT DOCUMENTS 2424997 12/1974 Fed. Rep. of Germany .
1565826 5/1969 France .

Primary Examiner—David L. Trafton
Attorney, Agent, or Firm—Oblon, Fisher, Spivak, McClelland & Maier

[57] ABSTRACT

An image contained in an incident signal is displayed on a screen forming part of a matrix-access display device. The device is primarily applicable to high-definition or small-area screens designed for operation in the transmission mode, and is controlled by an optical system. Optical addressing of a line array and a column array of electrodes is performed by means of light beams which serve to illuminate photodetectors.

9 Claims, 8 Drawing Figures

ELECTROOPTICAL SWITCHING DEVICE

This invention relates to matrix-control display devices which make it possible to represent a figure by breaking it down into a set of segments or intersections which vary in appearance under the control of electric signals applied to these latter by means of two sets of crossed connections. These signals serve to define addresses corresponding to said connections.

In one known design, a matrix access display device having addressing means which are entirely electric contains two orthogonal arrays of wire electrodes. An electrode array of this type consists of a set of elements designated as lines or columns according to the array considered. Each intersection between a line and a column defines a zone of local excitation of a display element. Electrical excitation of conductor lines and columns involves the use of electric control circuits which comprise a large number of passive and active components in order to deliver the control voltages during a suitable period of time. In fact, when carrying out sequential scanning, the control voltages must be applied during a sufficient period of time to produce a switching operation whereas the addressing instructions are received in the form of signals of short duration. This gives a clear idea of the complexity of all the switching elements, connections and different means for addressing these elements. The bulk of the control equipment placed at the periphery of a display beam becomes rapidly prohibitive in the case of devices of the high-definition type which are being extensively developed at the present time.

For similar reasons, conventional switching elements are ill-suited to small-area screens which are particularly advantageous on account of the low switching power required for their control. Display panels of small size can be adapted to large-screen projection by making use of an auxiliary light source whose radiation is optically modulated by changes of state of the panel elements.

In order to solve the problem of control of a display panel, consideration has already been given to the possibility of interposing a photosensitive layer between the display elements and one of the electrode arrays whilst addressing is performed by optical means. In the case of projection, however, a device of this type is attended by a disadvantage in that it gives rise to difficulties in regard to optical decoupling between the addressing control and the radiation which is employed in order to form an enlarged image of the display panel. In fact, the photosensitive layer must not react to the reading radiation. If it is sensitive to this radiation, provision must accordingly be made for an opaque protective layer in order to ensure that the image to be projected is not disturbed by any accidental control operation caused by the light which serves to project the image.

The present invention is intended to overcome these difficulties and will therefore be particularly applicable to high-definition display systems or to small-area systems. In fact, the invention makes it possible to separate the switching elements proper from the means for carrying out addressing operations and to achieve a considerable reduction in the equipment to be provided around the screen by reason of the fact that, in our invention, the switching elements and the leads which connect these latter to the voltage sources represent the greater part of the equipment whereas all the control circuits react to the incident signals in order to address the switching elements. The zone in which the image to be projected is formed does not contain any photosensitive control elements. It should be added that either a reflection or transmission mode of display can be adopted with equal ease, thus making it possible in particular to carry out projection of an image on a screen by means of an optical system. It is thus possible to design display elements having much smaller dimensions than was the case in the prior art, with all the advantages which arise from this reduction in size.

The invention consequently relates to a visual display device whereby a representation formed in a visual display zone by means of data introduced in the form of incident electric signals can be broken down into visual display elements. Said display elements are adapted to cooperate with electrodes connected to voltage sources by means of switching means located outside said zone. Said switching means essentially comprise optically-controlled switching elements and optical addressing means for controlling said switching elements. Said incident signals are intended to control the state of said visual display elements as a function of the light intensity delivered to said switching elements by said optical addressing means.

Other features of the invention will be more apparent to those skilled in the art upon consideration of the following description and accompanying drawings, wherein.

Depending on the type of application desired, a number of different physical phenomena can be contemplated such as, for example, certain optical effects produced by liquid crystals in either smectic, nematic or cholesteric phase. These forms of construction with liquid crystals will be described by way of example but it will be understood that any light emitter is suitable on condition that the sets of leads and electrodes are compatible in order to produce a light emission.

Figure 1:
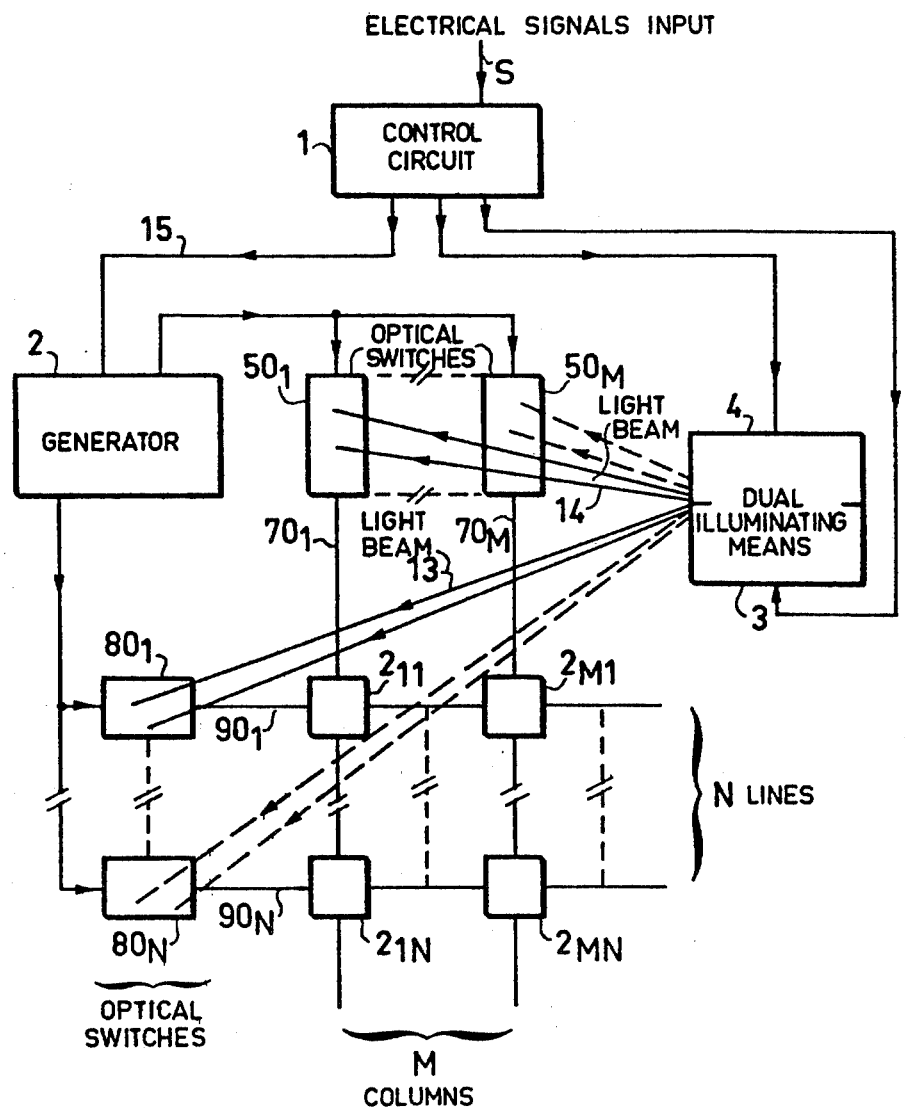
FIG. 1 is a general schematic diagram of a device according to the invention.

FIG. 1 shows the general arrangement or schematic circuit diagram of a visual display device according to the invention. The data S to be displayed are fed to the input of a control circuit 1. The data are signals representing characteristic elements of the information contained in an image to be projected. The circuit 1 serves to control the electric generator 2 and/or the optical addressing means 3 and 4 as a function of the data received. All the combinations of these two control operations are possible according to the nature of the data and the operating mode adopted.

By way of example and without any limitation being implied, the incident electric signals can appear in the form of a composite signal of the television signal type; the optical addressing means 3 and 4 operate in synchronism with the synchronization signals contained in said composite signal; the light beam 14 emitted by the optical addressing means is simply subjected in this instance to a recurrent deviation for successively scanning a line of photodetectors $50_1 \ldots 50_M$. The light beam 13 sweeps a column $80_1 \ldots 80_N$. The video component of the composite signal S is delivered by the circuit 1 to the control input of the electric generator 2. The electric generator 2 supplies the optical control switching elements $50_1 \ldots 50_M$ and $80_1 \ldots 80_N$, the elements 50 ... 80 supply line electrodes such as those designated by the references $90_1 \ldots 90_N$, and column electrodes such as those designated by the references $70_1 \ldots 70_M$. The visual display elements $2_{11} \ldots 2_{MN}$ are placed at the intersection of the lines 90 and of the columns 70 in order to form a matrix of MN elements addressable by M+N electric connecting leads.

The shape and character of the elements are very variable and essentially dependent on the image to be displayed. The elements can consist of any system in which a changing optical characteristic makes it possible to construct an image. Mention can be made of plasma cells, electroluminescent cells. Depending on requirements, control of the cells can be carried out either by current or by voltage. Voltage control makes it possible to produce an electric induction field. Current control can serve to produce transient heating. The lines and columns of electrodes are connected to voltage sources by means of switching elements along lines $80_1 \ldots 80_N$ and the columns $50_1 \ldots 50_M$ which are controlled optically by the addressing means 3 and 4. The positioning, geometrical dimensions and physical characteristics of these elements must be selected according to the type of application.

In accordance with the invention, optical addressing is directed to switching elements arranged at the periphery of the zone of formation of the image to be displayed. It should be mentioned in addition that these switching elements are much less complex than those which have to be employed in order to perform an electric control operation in accordance with known techniques. The switching elements $50_1 \ldots 50_M$ and $80_1 \ldots 80_N$ receive the voltages generated by the generator 2 and deliver these latter to the different line electrodes $90_1 \ldots 90_N$ or column electrodes $70_1 \ldots 70_N$. These voltages assume values corresponding to the optical addressing positions of the light beams 13 and 14 emerging from the optical addressing means 3 and 4. The connecting leads which are necessary for the constructional assembly of a device of this type are therefore limited in accordance with the invention to the sum of the number of electrode lines and columns M+N, which therefore leaves the possibility of designing high-definition assemblies with small dimensions.

Figure 2:
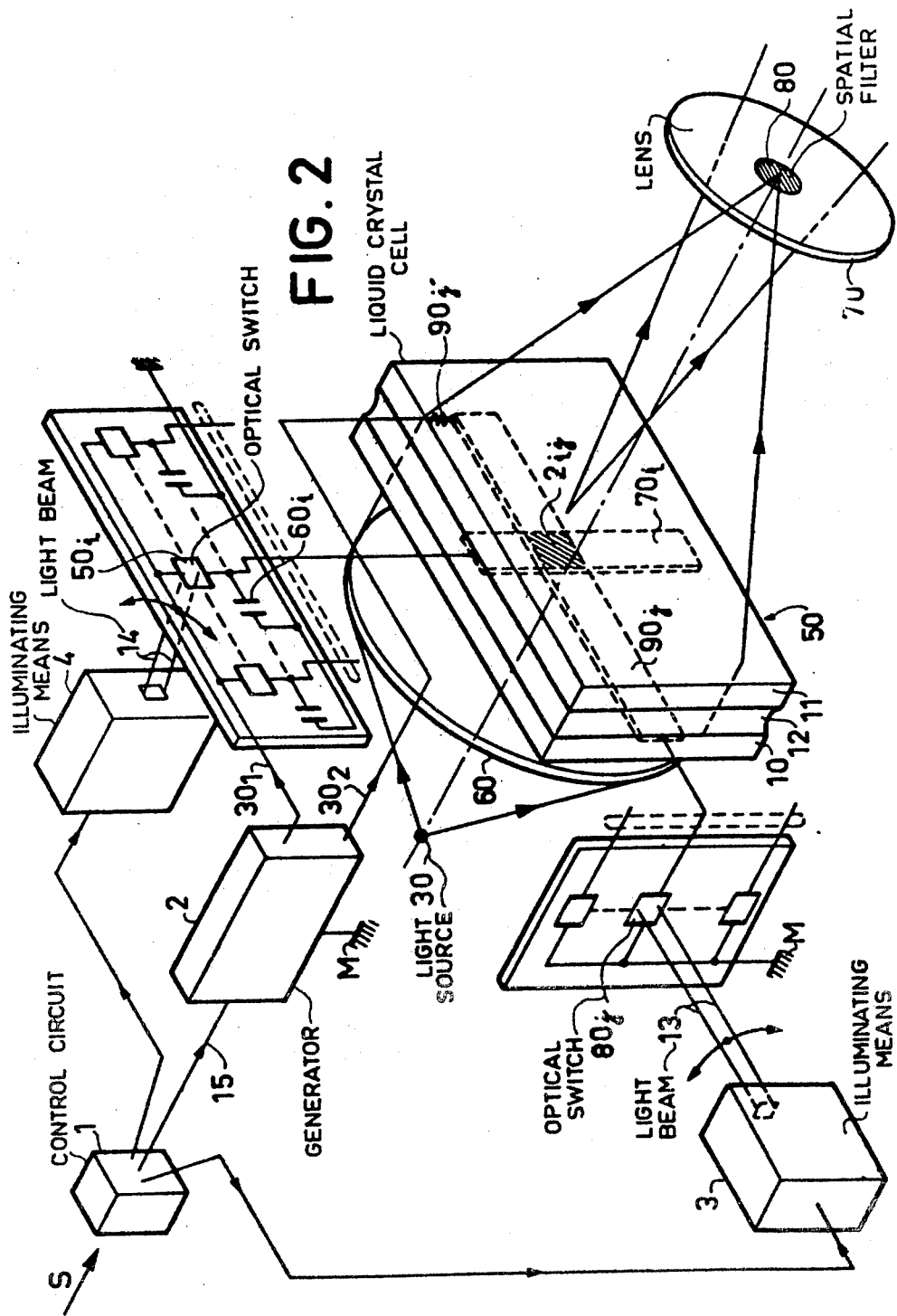
FIG. 2 is a view in isometric perspective of the device of FIG. 1.

FIG. 2 is a view in isometric perspective of the device of FIG. 1 in which the same elements are designated by the same references. The visual display assembly 50 comprises two supports 10 and 11 consisting of transparent glass plates, for example, if the device is employed in the transmission mode of operation. These supports 10 and 11 enclose a liquid crystal layer 12 which can be written under the action of an electric field. An array of line electrodes $90_1 \ldots 90_N$ and the array of column electrodes $70_1 \ldots 70_M$ are placed between each support 10 and 11 and the liquid crystal layer 12. Said lines and columns are obtained by the usual methods of metal deposition. At least one of these sets of electrodes is permeable to the projection radiation. A visual display element such as one element $2_{11} \ldots 2_{MN}$ is accordingly constituted by that portion of said liquid crystal layer 12 which is placed at the intersection of the line j and the column i. Depending on the electric field which exists between the electrodes j and i, the visual display element will have an appearance of either diffusion or of transparency and the complete assembly of visual display elements such as those designated by the references $2_{11} \ldots 2_{MN}$ will describe the overall display pattern. The electrode lines $90_1 \ldots 90_N$ are each connected at one end to the generator and at the other end to switching elements such as the elements $80_1 \ldots 80_N$. The other end of each switching element $80_j \ldots$ shares a common ground connection M with the generator 2.

By way of non-limitative example, the switching element $80_j$ is a photoconductive cell and this latter receives a radiation which is capable of reducing its resistance and therefore connecting the electrode $90_j$ to ground, said electrode being supplied as a current source.

The column electrodes $70_1 \ldots 70_M$ are each connected at one end, on the one hand to switching elements $50_1 \ldots 50_M$ and on the other hand to memory capacitors $60_1 \ldots 60_M$. The other end of each memory capacitor $60_1 \ldots 60_M$ is connected to a ground which is common to the generator 2. The other end of each switching element $50_1 \ldots 50_M$ is connected to the electric generator 2 via the leads $30_1$. The design function of the memory capacitors is to apply elementary voltages to the column electrodes $70_1 \ldots 70_M$ during a predetermined time interval, said elementary voltages being contained in the composite signal carried by the leads $30_1$. The light beams 13 and 14 illuminate respectively the photodetectors $80_1 \ldots 80_N$ and the photodetectors $50_1 \ldots 50_M$ in synchronism with the composite signal 15.

The beam 13 illuminates the photodetector $80_j$ and therefore produces a substantial resistance drop in this latter. The line $90_j$ is consequently connected to the ground M which is common with the generator 2. Since the other photodetectors 80 are not illuminated, they have a high resistance and the corresponding lines are at the voltage transmitted by the connecting lead $30_2$.

Before the beam 13 illuminates the line photodetector $80_j$, the beam 14 must successively illuminate all the photodetectors $50_1 \ldots 50_M$ in compliance with the synchronization of the composite signal in order to transmit the information to said photodetectors. The elementary signals are delivered to each column in correspondence with the illumination of their photodetector. In fact, when the photodetector $50_i$ is illuminated by the light beam 14, the memory capacitor $60_i$ is charged to the value of the voltage delivered at that instant via the connecting leads $30_1$; the electrode $70_i$ is therefore at this voltage.

Each of the other photodetectors 50 has an appreciable resistance by reason of the fact that it is not illuminated and its column electrode 70 is then at the voltage delivered by its memory capacitor 60. This delivered voltage is the elementary voltage of the signal which the memory capacitor has stored at the time of illumination of the corresponding photodetector by the light beam 14.

The light beam 13 subsequently controls the element $80_j$ in such a manner as to ensure that the potential difference which is present between the line j and the column i makes it either possible or not possible, according to its value, to produce the diffusing state of the element $2_{ji}$.

If Z designates the total addressing time of the image to be displayed, each line is connected sequentially to ground during the time interval Z/N and brought to the voltage delivered by the connecting lead $30_2$ during the time interval Z $(1-1/N)$. The columns are addressed by the beam 14 at the frequency M.N/Z. At the level of a column, the information must be stored at the level of the capacitive element $60_i$ during at least the time taken to scan one line, that is, Z/N. Furthermore, in order to charge the information rapidly at the level of said capacitive element, the time constant which characterizes the charge when the photoconductor is illuminated must be of low value compared with the time-duration of said illumination. The capacitors permit line-by-line access of the screen.

Figure 3:
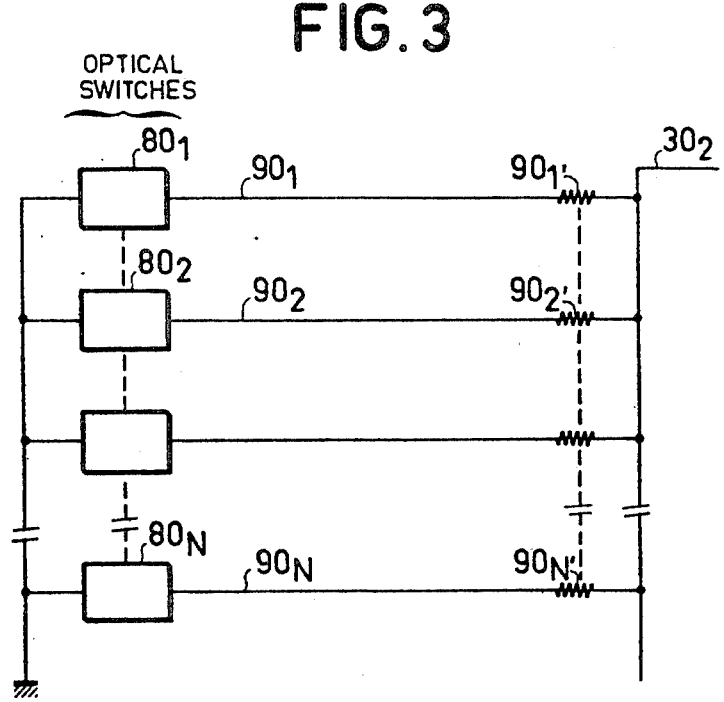
FIG. 3 is a schematic circuit diagram of the array of electrodes for addressing the lines of the image.

FIG. 3 is a schematic circuit diagram of the array of electrodes for addressing the lines of the image. The elements $90_{1'} \ldots 90_{N'}$ are resistive elements which produce a voltage drop when the electrodes 90 are connected to ground or in other words when their photodetector is subjected to illumination by the beam 14. It is an advantage to place these resistors between the electric generator 2 and the electrodes 90 in order to avoid overcrowding of areas reserved for the photodetectors.

Figure 4:
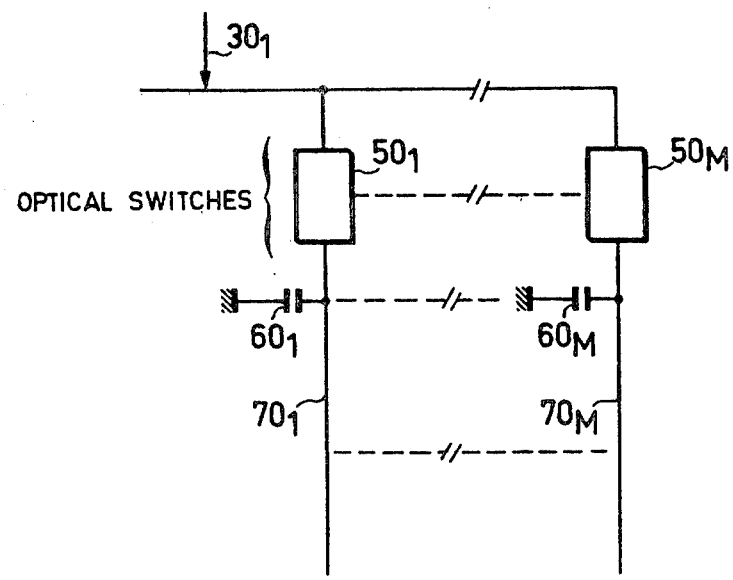
FIG. 4 is a schematic circuit diagram of the array of electrodes for addressing the columns of the image.

FIG. 4 is a schematic circuit diagram of the array of electrodes employed for addressing the columns of the image. The references are identical with those of the preceding figures.

An alternative embodiment of a device according to the invention can be provided by making use of liquid crystal cells in smectic phase.

Figure 8:
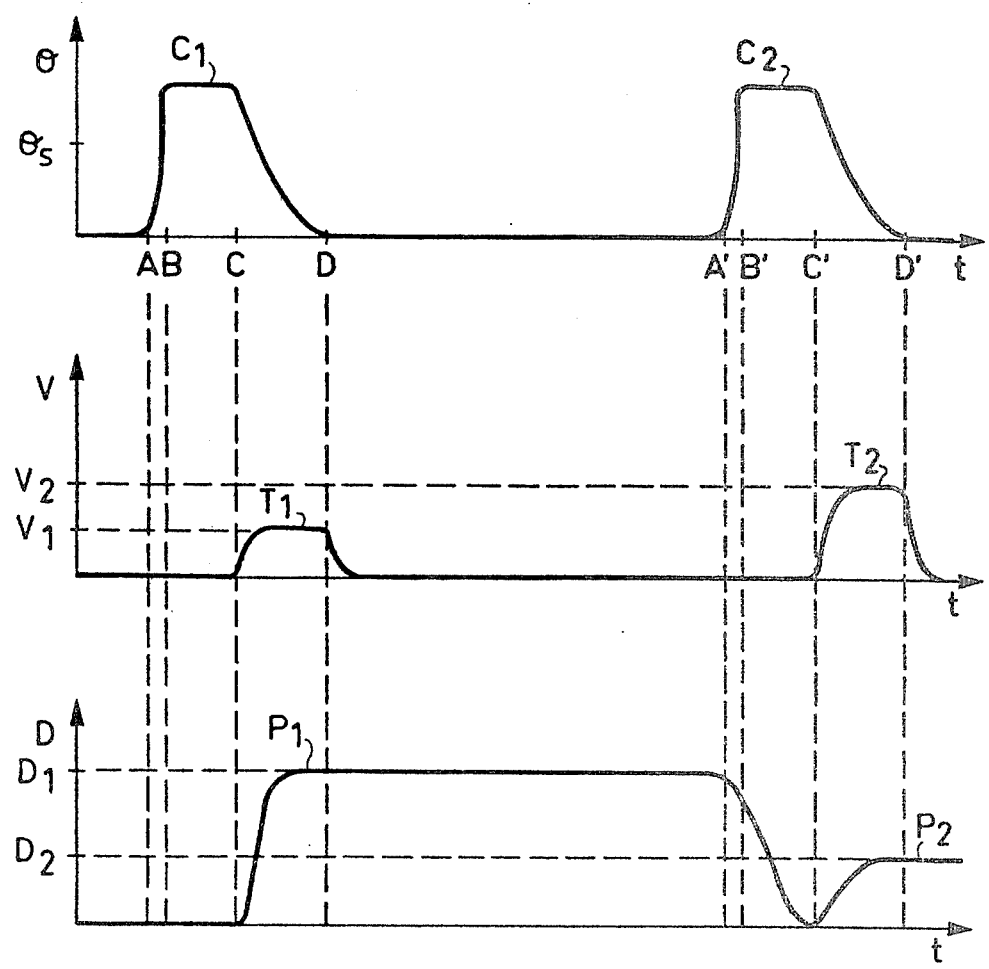
FIG. 8 illustrates the electro-thermal mode of control of a liquid crystal in smectic phase.

FIG. 8 illustrates the mode of electro-thermal control of a liquid crystal in smectic phase.

The curves $C_1$ and $C_2$ are time-dependent representations of the temperature of a smectic liquid crystal. The reference $\theta_s$ is the threshold temperature above which the liquid crystal is in a non-diffusing isomorphous phase.

The curves $T_1$ and $T_2$ represent the time-dependent values of voltages applied to a smectic liquid crystal.

The curves $P_1$ and $P_2$ show the variation of the coefficient of diffusion D of a smectic liquid crystal in accordance with the temperature cycles $C_1$, $C_2$ and the tensions applied during the cycles $V_1$, $V_2$; the temperature rise during the time interval AB and the level temperature stage BC bring the liquid crystal to a non-diffusing isomorphous phase. During the cooling time CD, the application of the voltage $V_1$ to the liquid crystal element endows this latter with a predetermined structure having a diffusion coefficient $D_1$ which will tend towards a zero value at the time of the following temperature rise. A voltage $V_2$ which is then applied during the cooling stage C'D' which is different from the voltage $V_1$ produces a diffusion coefficient $D_2$ which is also different from the coefficient $D_1$. It is thus possible to obtain a continuous sequence of states of diffusion of the liquid crystal layer at the time of cooling and to cancel said states by increasing the temperature to a value above the threshold temperature $\theta_s$.

Figure 5:
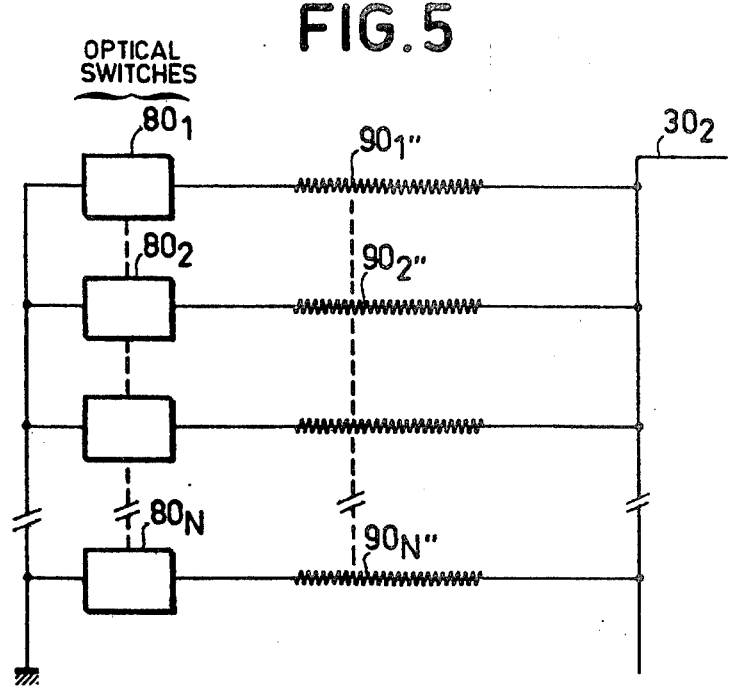
FIG. 5 shows an alternative embodiment of the schematic circuit diagram of FIG. 3.

FIG. 5 shows an alternative arrangement of the schematic circuit diagram of FIG. 3, this variant being applied to the case of liquid crystal cells in smectic phase.

The line electrodes are constituted by resistive elements $90_{1''} \ldots 90_{N''}$ which serve to heat that portion of the liquid crystal which is located in the proximity of said elements. When the light beam 13 sweeps the conductive element $80_j$ (the resistance of said element is negligible compared with the resistance of the element $90_{j'}$), the voltage of the connecting leads $30_2$ is applied to the terminals of the element $90_{j''}$, thus producing a heating action and having the effect of erasing the liquid crystal cells $2_{ji}$. At the time of cooling, the voltages delivered to the column electrodes $70_1 \ldots 70_M$ in accordance with the composite signal serve to establish variable electric charges and therefore to obtain different states of diffusion which compose the overall display pattern. The rest of the device is identical.

Figure 6:
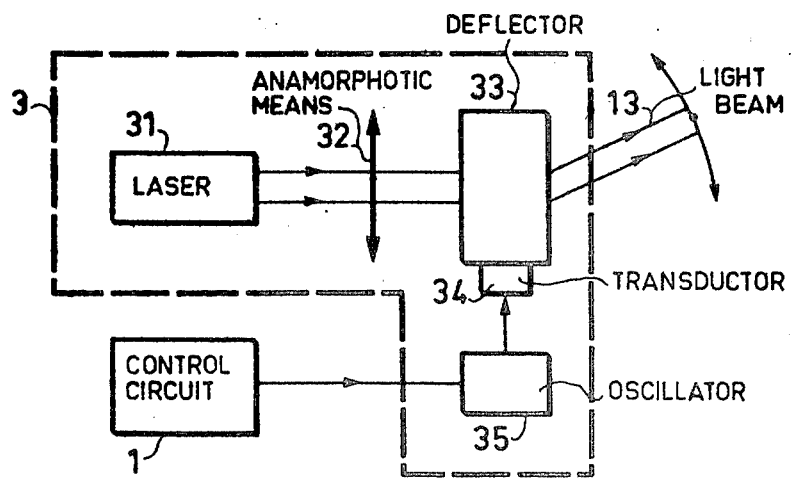
FIG. 6 illustrates an optical addressing means according to the invention.

FIG. 6 illustrates a device in which provision is made for optical addressing means and is similar to the device 3 or 4 described with reference to the preceding figures. However, any practical arrangement for obtaining a light radiation of sufficiently pointlike character which can be modulated in intensity and can undergo rapid deflections may be employed as optical addressing means in accordance with the invention.

By way of example, the device 3 comprises a light radiation source 31 such as a semiconductor laser, a beam-shaping optical system 32, a tunable oscillator 35 which receives a tuning signal from the control circuit 1 and produces action on a transducer 34 which forms part of a deflector 33 of the acoustooptical type, for example, in order to carry out a Bragg-effect deflection of the beam emerging from the system 32. The beam 13 issuing from this device controls the different switching elements $80_1 \ldots 80_N$ for optical control of the visual display device in accordance with the invention. This mode of operation of the device in accordance with the invention can be a reflection mode in which the viewing light is the ambient light. The advantage of a device of this type lies in the fact that an increase in viewing light intensity does not produce a reduction in contrast of the image to be displayed but results on the contrary in enhanced contrast. The device also operates in the transmission mode and makes it possible to project the entire visual display on a screen for more convenient viewing. By means of this method, display assemblies having very small dimensions can be constructed, this being made possible by the invention after simplifying the necessary control connections.

Figure 7:
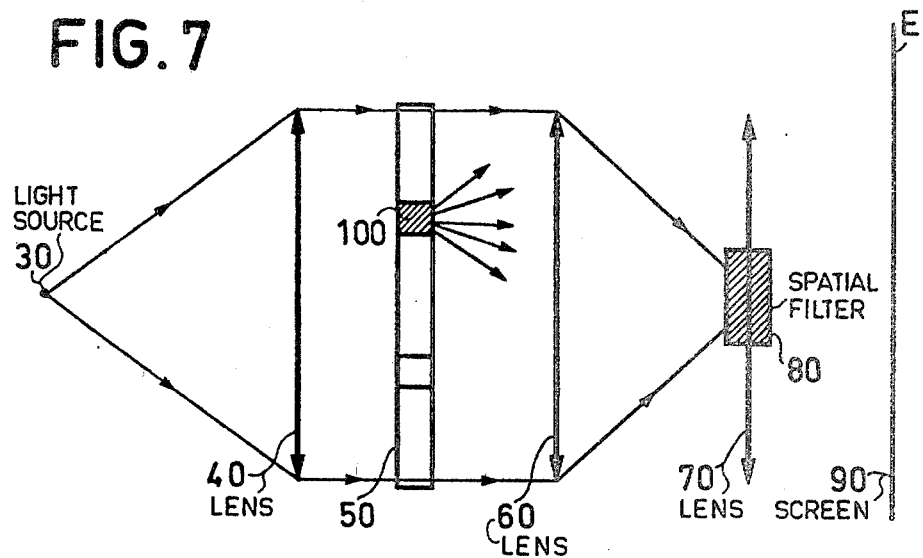
FIG. 7 is an explanatory diagram.

One example of an optical system for carrying out a projection of the type just described is illustrated in FIG. 7. This system comprises a light source 30, a light radiation being caused to pass through a beam-shaping optical system 40 and to illuminate the display assembly. When the elements are liquid crystal cells and assuming that these latter are in the non-diffusion phase, the light rays pass through the charge lens 60, converge on the object-lens 70 and are stopped by the opaque spatial filter 80. A diffusing element such as the element 100 emits light radiations which are not all stopped by the spatial filter 80 and will be projected onto the screen 90 which will therefore perform the function of a display screen. The optical-control switching elements have been described as photoconductors. It would not constitute a departure from the scope of the invention, however, to use phototransistors or any other device in which the effects produced by the action of a suitable light beam on the electrodes would be identical to those described.

The invention covers all fields of application of visual display panels and is particularly applicable to high-definition display screens or to small-size devices.

What is claimed is:

1. A visual display comprising:

plural display elements formed by plural electrodes arranged in first and second orthagonal arrays to define a visual display zone;

data generation means for generating first signals to be applied to the electrodes of the first array electrodes and for supplying second signals in the form of predetermined potentials to be applied to the electrodes of said second array, said first signals having a voltage level which varies in correspondence to an image to be displayed;

switching means for connecting said first signals and said second signals to the electrodes of said first and said second arrays, respectively, comprising, optically controlled switching elements each having a first terminal coupled to said data generation means and a second terminal coupled to a respective electrode, said first signals coupled to the first terminal of the switching elements connected to the first array of said electrodes and said second signals applied to respective of the first terminals of the switching elements and through respective resistors to the electrodes of the second array, optical addressing means for optically scanning said switching elements to control switching of said switching elements, and memory capacitors connected to respective second terminals of said switching elements which have said first signals applied to the first terminals thereof.

2. A device according to claim 1, wherein each switching element comprises said first and second terminals and a sensitive range for receiving a control beam of incident radiation and the electrical resistance offered by said switching element between said terminals has at least two distinct values.

3. A device according to claim 2, wherein the optical addressing means for controlling the switching elements comprise at least one source of light radiation and at least one electrically controlled optical deflector which receives a beam from said source, the beam which emerges from said deflector being adapted to scan said switching elements, electric control signals for deflecting said beam being produced by an electric control circuit which receives the incident electric signals.

4. A device according to claim 1, wherein the display elements comprise a liquid crystal whose appearance is dependent on the application of an electric field, said field being produced by the electrode arrays, aforesaid.

5. A device according to claim 4, wherein the visual display element comprises a liquid crystal in nematic phase whose state of diffusion is dependent on the application of an electric field, said field being produced by the electrode arrays aforesaid.

6. A device according to claim 4, wherein the visual display element comprises a liquid crystal in smectic phase, the appearance of said liquid crystal being also dependent on transient heating produced by the circulation of an electric current within one of the electrode arrays aforesaid.

7. A device according to claim 1, wherein the display elements comprise electroluminescent diodes.

8. A device according to claim 1, wherein the switching elements comprise phototransistors.

9. A device according to claim 1, comprising;

an auxiliary light source for producing radiation which is modulated optically by the changes of state of the visual display elements.

* * * * *